(12) United States Patent
Gschwind et al.

(10) Patent No.: US 7,213,123 B2
(45) Date of Patent: May 1, 2007

(54) METHOD AND APPARATUS FOR MAPPING DEBUGGING INFORMATION WHEN DEBUGGING INTEGRATED EXECUTABLES IN A HETEROGENEOUS ARCHITECTURE

(75) Inventors: Michael Karl Gschwind, Chappaqua, NY (US); Kathryn M. O'Brien, South Salem, NY (US); John Kevin O'Brien, South Salem, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 10/280,243

(22) Filed: Oct. 24, 2002

(65) Prior Publication Data

US 2004/0083331 A1 Apr. 29, 2004

(51) Int. Cl.
*G06F 12/10* (2006.01)
(52) U.S. Cl. .................. 711/202; 711/217; 711/220
(58) Field of Classification Search ............ 711/5, 711/205, 202, 217, 218, 219, 220
See application file for complete search history.

(56) References Cited

U.S. PATENT DOCUMENTS

| | | | |
|---|---|---|---|
| 4,882,674 A | 11/1989 | Quint et al. ............ 719/320 |
| 5,339,430 A | 8/1994 | Lundin et al. | |
| 5,659,701 A | 8/1997 | Amit et al. ............ 719/317 |
| 5,664,159 A | 9/1997 | Richter et al. | |
| 5,684,955 A | 11/1997 | Meyer et al. ........... 719/316 |
| 5,761,137 A | 6/1998 | Johnson et al. | |
| 5,812,848 A * | 9/1998 | Cohen ................... 719/331 |
| 5,960,466 A * | 9/1999 | Belgard ................. 711/213 |
| 6,006,248 A | 12/1999 | Nagae ................... 718/105 |
| 6,077,312 A | 6/2000 | Bates et al. | |
| 6,119,247 A * | 9/2000 | House et al. ............ 714/38 |
| 6,138,209 A * | 10/2000 | Krolak et al. ........... 711/128 |
| 6,145,119 A * | 11/2000 | House et al. ........... 717/101 |
| 6,157,960 A | 12/2000 | Kaminsky et al. ....... 719/315 |
| 6,202,200 B1 * | 3/2001 | House et al. ........... 717/100 |
| 6,209,061 B1 | 3/2001 | Nelson et al. | |
| 6,219,803 B1 * | 4/2001 | Casella et al. .......... 714/38 |
| 6,427,234 B1 | 7/2002 | Chambers et al. | |
| 6,430,600 B1 | 8/2002 | Yokote | |
| 6,446,137 B1 | 9/2002 | Vasudevan et al. | |
| 6,480,818 B1 | 11/2002 | Alverson et al. | |
| 6,526,491 B2 | 2/2003 | Suzuoki et al. | |
| 6,671,746 B1 | 12/2003 | Northrup | |
| 6,704,842 B1 | 3/2004 | Janakiraman et al. | |
| 6,735,601 B1 | 5/2004 | Subrahmanyam | |
| 6,738,977 B1 | 5/2004 | Berry et al. | |

(Continued)

OTHER PUBLICATIONS

A toolkit for detecting and analyzing malicious software □□Weber, M.; Schmid, M.; Schatz, M.; Geyer, D.; Computer Security Applications Conference, 2002. Proceedings. 18th Annual, Dec. 9-13, 2002; pp. 423-431.*

(Continued)

*Primary Examiner*—Brian R. Peugh
(74) *Attorney, Agent, or Firm*—Carr LLP; D'Ann Rifai (57) ABSTRACT

The present invention provides for the employment of a dynamic debugger for a parallel processing environment. This is achieved by dynamically updating mapping information at run-time in a mapping table, wherein the mapping table is read by the dynamic debugger.

20 Claims, 8 Drawing Sheets

U.S. PATENT DOCUMENTS

| | | |
|---|---|---|
| 6,760,907 B2 | 7/2004 | Shaylor |
| 6,779,049 B2 | 8/2004 | Altman et al. |
| 2002/0078308 A1 | 6/2002 | Altman et al. .............. 711/147 |
| 2002/0144241 A1 | 10/2002 | Lueh |
| 2004/0205697 A1 | 10/2004 | Hylands et al. |

OTHER PUBLICATIONS

Debugging protocol for remote cross development environment☐☐Seungwoo Son; Chaedeok Lim; Neung-Nam Kim; Real-Time Computing Systems and Applications, 2000. Proceedings. Seventh International Conference on , Dec. 12-14, 2000; pp. 394-398.*

Reflections on remote reflection☐☐Richmond, M.; Noble, J.; Computer Science Conference, 2001. ACSC 2001. Proceedings. 24th Australasian , Jan 29-Feb. 4, 2001; pp. 163-170.*

Tanenbaum, "Structured Computer Organization", © 1984, Prentice-Hall, Inc., p. 10-12.*

Orr et al., "OMOS- An Object Server for Program Execution", © 1992, IEEE, p. 200-209.

"Chapter 7: Linking", © 1998 Micro Focus Limited, p. 1-11.

Winner, "Naming and Binding in a Vertical Migration Environment", © 1988 IEEE, p. 599-607.

Implementing a component architecture on multiple distributed object frameworks—Ben-Shaul, I.; Gish, J.W.; Robinson, W.; Enterprise Distributed Object Computing Workshop, 1998. EDOC '98. Proceedings. Second International, Nov. 3-5, 1998; pp. 319-329.

Experience with secure multi-processing in Java—Balfanz, D.; Distributed Computing Systems, 1998. Proceedings. 18th International Conference on, May 26-29, 1998; pp. 398-405.

* cited by examiner

```
symbol_record=symboltable(this_symbol);
dynamic_occurrances=empty list;
for (i in 1 ...symbol_record.entrycount)
{
    if(symbol_record.entry[i].enrtytype==MPU
        /*if a static definition is in MPU system memory, it is a dynamic occurrence*/
        add <MPU, symbol_record.entry[i].offset > to dynamic occurances
    else/*symbol_record.entry[i].entrytype==APU*/
    {
        /*a static definition can have 0, 1 or more dynamic occurrences...
        0-module with this static definition has not been loaded
        1 - the module with this static definition has been loaded exactly once
        >1- the module this static definition has been loaded in multiple execution environments;
        multiple static definitions in different APUs are possible*/
        for (loadtable_entry in dynamic module load table)
            if loadtable_entry.module_id==symbol_record.entry[i].module_id
                add<APU,
                    loadtable_entry.memory_id
                    symbol_record.entry[i].offset+loadtable_entry.module_baseaddress > to dynamic occurrences
    }
}
return dynamic_occurrences
```

METHOD AND APPARATUS FOR MAPPING DEBUGGING INFORMATION WHEN DEBUGGING INTEGRATED EXECUTABLES IN A HETEROGENEOUS ARCHITECTURE

CROSS-REFERENCE TO RELATED APPLICATIONS

This application relates to co-pending U.S. patent applications entitled "METHOD AND APPARATUS FOR SETTING BREAKPOINTS WHEN DEBUGGING INTEGRATED EXECUTABLES IN A HETEROGENEOUS ARCHITECTURE" Ser. No. 10/280,677, "METHOD AND APPARATUS FOR OVERLAY MANAGEMENT WITHIN AN INTEGRATED EXECUTABLE FOR A HETEROGENEOUS ARCHITECTURE" Ser. No. 10/280,242, "METHOD AND APPARATUS FOR ENABLING ACCESS TO GLOBAL DATA BY A PLURALITY OF CODES IN AN INTEGRATED EXECUTABLE FOR A HETEROGENEOUS ARCHITECTURE" Ser. No. 10/280,187, and "METHOD AND APPARATUS FOR CREATING AND EXECUTING INTEGRATED EXECUTABLES IN A HETEROGENEOUS ARCHITECTURE" Ser. No. 10/280,244, filed concurrently herewith and having the same inventors, Michael Karl Gschwind, Kathryn O'Brien, John Kevin O'Brien, and Valentina Salapura.

TECHNICAL FIELD

The invention relates generally to multiprocessing and, more particularly, to debugging linked software running on separate processors.

BACKGROUND

Parallel processing, which generally comprises employing a plurality of microprocessors coupled to the same computer system to concurrently process a batch of data, is of great importance in the computer industry. Generally, there are three major types of parallel processing. These are parallel processing systems employing shared memory or distributed memory or a combination of the two. Typically, shared memory is memory that can be accessed in a single operation, such as a "load" or "read" command, by a plurality of processors. Distributed memory is memory that is localized to an individual processor. In other words, in a distributed system, each processor can access its own associated memory in single access operation, but typically cannot access memory associated with the other processors in a single operation. Finally, there is a hybrid, or "heterogeneous," parallel processing, in which there is some system memory accessible by one or more processors, and some memory which is distributed and local to at least one processor.

One such example of a hybrid parallel processor system comprises at least one reduced instruction set (RISC) main processor unit (MPU), such as a PowerPC™ processor, and at least one specialized or "attached" processor unit (APU), such as a Synergistic™ APU (SPU). Typically, the MPU is employed to execute general-purpose code, wherein the general purpose code comprises complex control flows and orchestrating the overall hybrid parallel processing function. The MPU has access to the full range of system memory. The APU is generally directed to executing dataflow operations. In other words, the APU calculates highly repetitive multimedia, graphics, signal, or network processing workloads which are identified by high compute to control decision ratios. In conventional hybrid systems, APUs do not have access to the system memory, and their own memory, the local store, is typically smaller than the shared memory.

Generally, while employment of the hybrid system provides high computational performance, it poses significant challenges to the programming model. One such problem relates to the APU. The APU cannot directly address system memory, Therefore, any code to be run on the APU has to be transferred to an associated local storage of the APU before this code can be executed on the APU. This creates problems in the linking/binding process.

To help solve various problems during software design and implementation, programmers employ debuggers. Typically, low-level operations used by a debugger are classified as one of three primitives. A first debugger primitive involves stopping a program at a well-defined location. This requires that the debugger (1) identifies the address associated with a function name, file/line number, or other uniquely identifying source code construct, and (2) setting a break point.

A second debugger primitive concerns mapping a program location to the file/line number, function name or other uniquely identifying source code construct. This requires the debugger to map a memory address to such source construct. The memory address mapped is usually the current address of the program counter PC which involves rereading the value of the PC register by the debugger. As is understood by those of skill in the art the, program counter comprises the memory address of the instruction currently being executed.

A third debugger primitive allows reading and writing of program data. This requires that the debugger identifies the memory address associated with a data object or variable. Typically, setting a breakpoint is used in conjunction with read or write accessing the contents of the address memory location.

Generally, each of the three primitives above comprises a mapping step (1) and an operative step (2). The mapping step identifies the correlation between the executable object code and the source code or some other mapping indicia, whereas the operative step comprises other operations performed by the debugger. To perform the mapping step, debuggers use at least one mapping indicia table and a debugging table originally generated by the compiler and updated by the runtime environment. The mapping table has information associated with the location of each program object, each mapping name, the correlation between file/line numbers and object addresses, the layout of variables, the stack layout, and so on. These mapping indicia tables can, for example, be represented in the form of symbol tables, stabs debugging entries, etc.

Typically, in conventional systems, the mapping is static in nature. In other words, typically, the addresses associated with particular objects are fixed at compile time and are not changed over the course of the execution of a program. However, automatic variables allocated to a stack, wherein the automatic variable are referenced at a fixed and predetermined offset relative to a changing stack, frame, base or other such stack management pointer typically maintained in a processor hardware register, can be dynamic in nature.

Static implementations of maps for debuggers are not sufficient in a heterogeneous processing system. For instance, as the code and data is loaded and unloaded from the system memory to a local store of an APU, the memory addresses of code and data will change. Furthermore, code stored in the local store of the APU will be overwritten, hence, making not all symbols available at all times.

Therefore, what is needed is a debugger for debugging heterogeneous architecture that overcomes the deficiencies of conventional debuggers.

SUMMARY

The present invention provides dynamically mapping from a mapping indicia to a memory address or other register address. If the mapping indicia is determined to be of the type associated with a selected separate execution environment, at least one module in which the mapping indicia is located is selected. The module selected is also associated with the selected separate execution environment. If it is determined that the at least one module associated with the mapping indicia is loaded into the memory of the selected separate execution environment, at least one memory address of the mapping indicia is provided.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
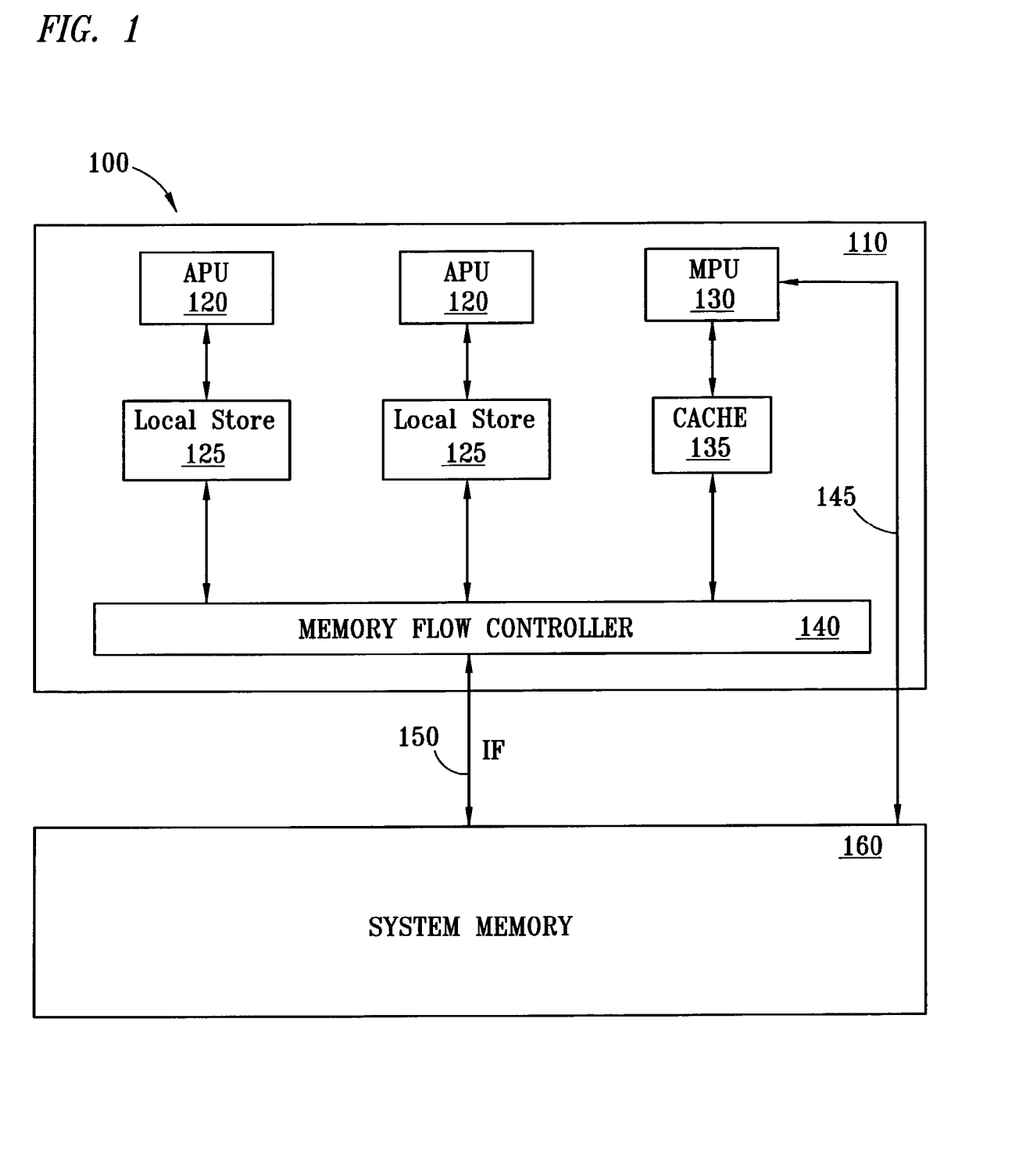
FIG. 1 schematically depicts a hybrid parallel processing environment in which the current invention for mapping debugging information in a heterogeneous instruction set architecture is employed.

Referring to FIG. 1, the reference numeral 100 generally designates heterogeneous parallel processing architecture that provides an environment for the passing of information by employment of a stub function. The architecture 100 comprises distributed computing environment 110 and a shared system memory 160, both of which are electrically coupled by an interface 150. The environment 110 comprises a plurality of APUs 120, each with its respective local store 125. The environment 110 further comprises an MPU 130, such as a RISC processor, and its level one cache 135. In one embodiment, the MPU 130 is coupled to the system memory 160 through a signal path 145. In one embodiment, the APU 120 comprises an SPU. In one embodiment, a single MPU 130 is employed. In a further embodiment, a plurality of MPUs 130 are employed.

The environment 110 further comprises a memory flow controller (MFC) 140. Generally, the MFC 140 enables the movement of data and synchronization capability between the MPU 130 and the APU 120 processors, and provides for data transfer between the main system memory 160 and local storage 125. In FIG. 1, the MFC 140 is coupled to the system memory 160 through the interface 150.

Generally, the MFC 140 enables the movement of information, both text (that is, code) and data, between the system memory 160 and the local store 125 of the APU 120, at the request of the main processor 130 or the APU 120. Because the APU 120 does not have direct access to the system memory 160, the MFC 140 transfers information between the system memory 160 and the local store 125 of the APU 120, at the request of a transfer function, such as stub function, running on either the APU 120 or the MPU 130. In one embodiment, the MFC 140 comprises a direct memory access (DMA) device.

The architecture 100 is an environment in which an executable program runs, wherein the executable program comprises a first set of functions executing on the MPU130 and one or more modules executing on one or more APU processors 120. In one embodiment, the program code executing on MPU 130 executes stub functions to dynamically load modules from system memory 160 to one or more local stores 125. In the stub function, code and data to be employed by the APU 120 is encapsulated as a software "object." Generally, the stub function commands the MFC 140 to transfer information between two separate execution environments, such as the system memory 160 and the local store 125. The stub function enables the MPU 130 to stream code and data to the local store 125 of the APU 120 for processing, for the APU 120 to perform the processing, and for the APU 120 to then stream the processed data back to the MPU 130. This processing of the data and code performed by the APU 120 is invisible to the MPU 130, and allows the MPU 130 to concurrently perform other data processing or program flow control tasks concurrently.

Typically, the stub function commands the MFC 140 to stream both code and data to a designated address within the local store 125 of a selected APU 120 from the designated addresses in the system memory 160. The stub function also commands the MFC 140 to command the APU 120 to process the data. The commands issued from the stub function to the APU 120 are remote commands. Generally, remote commands are commands that are sent from a first execution environment to a second execution environment. Typically, the stub function is the single entry point to the APU 120. In other words, the APU 120, or its associated local store 125, is typically only accessible through the stub function.

When the stub objects are stored in the local stores 125 of APUs 120, their corresponding memory addresses change. This information is changed in a table of dynamic map information, and is accessed by a dynamic debugger.

Figure 2A:
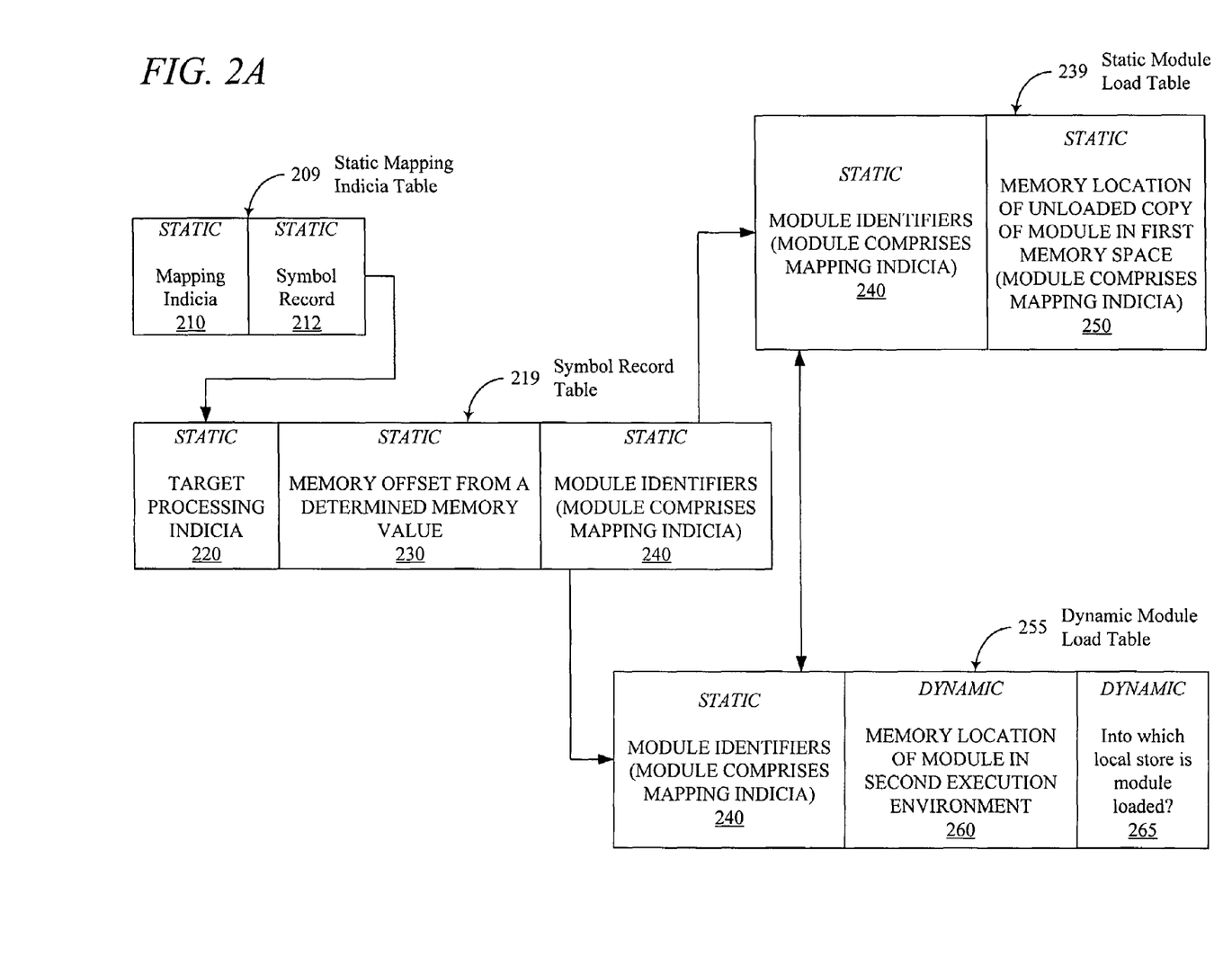
FIG. 2A schematically depicts one embodiment of three linked static data mapping tables and a linked dynamic mapping table, each table comprising a plurality of data fields.

Turning now to FIG. 2A, illustrated are information tables 200. The tables 200 comprise the static mapping indicia table 209, the symbol record table 219, the static load table 239 and the dynamic module load table 255. The static mapping indicia table 209 comprises mapping indicia 210 and a record symbol 212. The static symbol record table comprises a target processor indicia 220, a memory offset 230, and a static module identifier 240. The static module load table comprises the static module identifier 240 and the static module memory location 250. The dynamic module load table 255 comprises the static module identifier 240, a dynamic module memory location 260, and a dynamic local store indicia 265. The table 212 and the table 219 are linked by the static record symbol 212. The table 219 is linked to both the table 239 and the table 255 through the static module identifier 240.

The dynamic module load table 255 is dynamically updated by the runtime environment, the operating system of the environment 100, or some other mechanism. Generally, a compiler creates the static tables 209, 219, and 239, and a runtime environment, the operating system, or some other functionality creates and updates the dynamic load table 255. In one embodiment, when a module (either a code module, data module, or mixed module) is loaded into or unloaded from the separate execution space, such as a local store 125, during run time, the dynamic linker updates the dynamic module load table 255 during run time. The information that is updated are the fields 240, 260 and 265. In another embodiment, the dynamic module load table 255 allows the programmer employing a debugger to determine, for the separate memory associated with at least one APU 120, which modules are loaded therein.

The tables 200 also enable the programmer employing the debugger to determine whether a selected module has been loaded into one or multiple memories (such as the local store 125) and, if so, to which one or more memories, through employment of fields 240, 260 and 265 of the dynamic module load table. Generally, the dynamic information of the dynamic map 255 is created at runtime. In another embodiment, the static tables 209, 219 and 239 are created by the compiler.

Typically, as code modules are loaded and unloaded into the associated local stores 125 of one or more attached processor units 120, the location of said modules in the local store 125 can vary from loading to loading. Therefore, the operating system, the runtime environment, and so on, dynamically updates the dynamic module load table 255 with the new module load addresses. The tables 200 is then employed by a dynamic debugger for conveyance of debugging information to a programmer, which can comprise the address offset 230 of a particular function of a particular module, and the load address 260 of that module, and the local store employed by loaded module, as indicated by the dynamic local store indicia 265. Although the tables 200 are illustrated in FIG. 2A as comprising a plurality of tables, those of skill in the art understand that different fields can be contained in one or more tables, wherein the tables reference one another.

In FIG. 2A, the table 209 comprises two fields. These are the mapping indicia 210, and the symbol record 220. Generally, the mapping indicia 210 comprises a symbol or similar information. As is understood by those of skill in the art, a symbol generally comprises a function name, variable name, or other such name as may be used to refer symbolically to an address, or register number, or other such structure. In a further embodiment, the register number comprises an address of a register in a separate memory, referred to as register file, within a processor. The mapping indicia 210 can further comprise other mapping information, such as a paired file name and line number. The symbol record 212 indicates the link between the table 209 and the symbol record table 219. In one embodiment, the symbol record 212 is a pointer to a specific entry in table 219.

The symbol record table 219 comprises a target processor indicia 220, at least one memory offset 230, and a module identifier 240. In one embodiment, each occurrence of the symbol indicia 210 in a module is entered into the record table 219 and correlates to the module identifier 240, as well as associated field information. The target processor indicia 220 generally refers to at least one processor, such as the APU 120 or the MPU 130, to which the mapping indicia 210 corresponds. Depending upon how an executable was generated, symbols with the same name (or other such mapping indicia 210) can be defined in an APU 120 and the MPU 130 at the same time, or in multiple APUs 120. Therefore, the target indicia 220 signals to the debugger, and hence to the human programmer, to which class of processor, including the MPU 130, the module identifier 240 corresponds.

The at least one memory offset 230 generally refers to the size of a memory distance between a determined reference point, such as the beginning of a module, and the memory address of the mapping indicia 210. In one embodiment, the offset refers to a specific function, variable or line of code with the loadable module. In a further embodiment, offset 230 comprises a plurality of offsets, therefore creating a plurality of related entries in the table 219, as a given mapping indicia 210 can be present in more than one module. The determined reference point can be from the beginning of a module, or relative to the beginning of text or data space, or the offset from an otherwise determined value, such as a stack pointer, a frame pointer, an argument pointer, a global area pointer, a register, a designated memory location, and so on.

The symbol record table 219 further comprises a module identifier 240. Generally, the module identifier 240 identifies the module to which the mapping indicia 210 corresponds. This information is kept in the symbol record table 219. In one embodiment, the symbol record table 219 information table is still maintained and kept when the module is not loaded to the separate execution environment information. Typically, the mapping indicia 210 is associated with more than one module identifier 240.

For instance, a library element or other form of mapping indicia 210 can be linked into different modules, due to such factors as automatic program partitioning for parallelization and replication of some common functions to reduce inter-module calls. If the mapping indicia 210 is maintained in a separate library module, in one embodiment the entire module is loaded to replicate one or two functions that are needed. In another example, in one embodiment, if the environment 100 is to employ a square root function, the entire math library module is loaded to the local store 125 of the selected APU 120. Therefore, each module can have a different offset 230 associated with a mapping indicia 210 referring to an address in such module, thereby referencing the specifically desired function within the module. Therefore, each occurrence of a mapping indicia 210 in a module has its own entry in the symbol row record table 220.

The static module load table 200 comprises the module identifier 240 and an unloaded memory location 250. The unloaded memory location 250 generally corresponds to the memory base address of the image of the module 240 (to which the mapping indicia 210 corresponds) in the system memory 160. The image of the module resides in the system memory 160 to be copied and streamed to the local store 125 of an APU 120 in a stub function.

However, when the module is loaded to the second execution environment, such as the local store 125 of a selected APU 120, the dynamic module load table 255 is employed. The static module identifier 240 indicates which module has been loaded to the second execution environment. Generally, memory location 260 indicates the load address of the module into the second execution environment, such as the local store 125 This memory location 260 can be summed with the memory offset 230 to generate a desired corresponding address for the debugger. Or other such program which needs to perform a mapping step between a mapping indicia and a memory address, or vice versa.

The APU location 265 is also employed. The APU location 265 indicates to which particular APU the module is loaded. Generally, the dynamic map 200 comprises indicia of the location in the memory of a loaded module in the local store 125 of the APU 120.

Figure 2B:
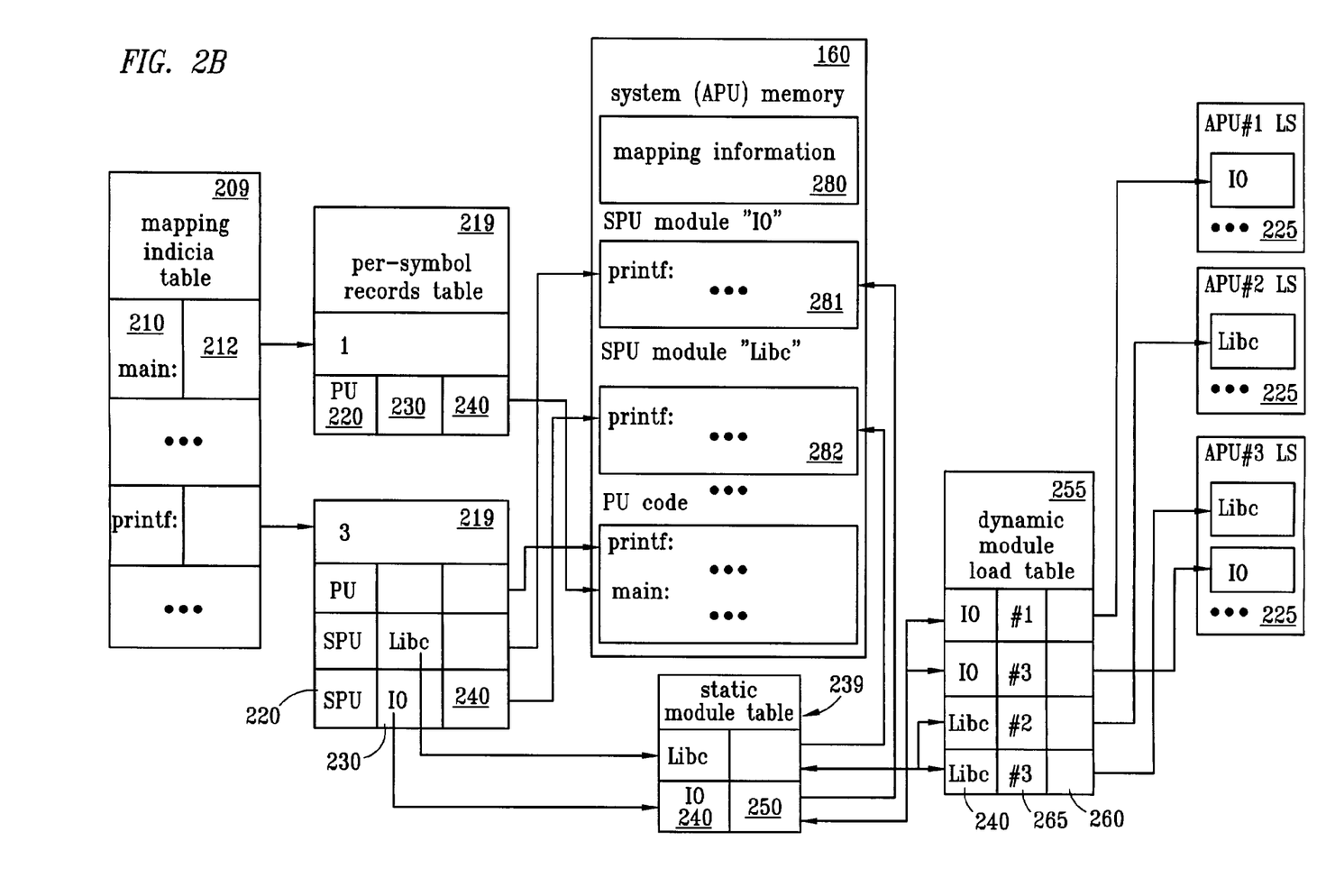
FIG. 2B schematically depicts relationships between the data fields of the static and dynamic mapping tables and the heterogeneous parallel processing environment.

Turning now to FIG. 2B, disclosed is one embodiment of the relationships of the data fields 210, 212, 220, 230, 240, 250, 260, and 265 of the mapping tables 200 and the first and second execution environments. In FIG. 2B, a mapping indicia table 209 is logically coupled to per symbol tables 219. Individual rows of the mapping indicia table 265, "row x" and "row y," correspond to a unique mapping indicia 210, wherein each mapping indicia 210 is correlated to at least one per-symbol record in the per-symbol record table 219. Each per-symbol record listing one or more definitions in either MPU system memory 160 or in one or more APU local stores 125. Generally, a definition is the fields 220, 230 and 240 of one or more rows of information that correspond to each instance of the mapping indicia 210 in a module. Furthermore, each per-symbols record table 219 corresponds to a count of the number of modules in it. In FIG. 2A, "main" has a count of "1" in the first per-symbol record table 219, and "printf" corresponds to a count of "3". Generally, each count corresponds to how many times a given mapping indicia 210 is referenced in the module images loaded to the MPU 130.

In FIG. 2B, the images of each of the modules are stored in their own respective addresses 281, 282 in the system memory 160. In an embodiment of the system memory 160, mapping information 280 is the memory region where the static tables 209, 219 and 239 are located.

The module table 239 is logically connected to the shared memory 260. Generally, the static module table 239 comprises fields 240 and 250. These fields are employed to load a module from the first execution environment to the second execution environment, such as from the shared memory 160 of one MPU 140 to the local store 120 of one APU 120.

The static module table 239 is coupled to the dynamic load table 255. The dynamic load table 255 comprises the memory location of the address 260 of the location of the module in the second execution environment, such as the local store 125. Generally, the dynamic module load table 290 comprises fields module identifier field 240, module load offset 260 and targeted 265. The fields in the dynamic module load table 255 can then be read by a debugger and a human, to determine the corresponding mapping indicia 210.

Figure 3A:
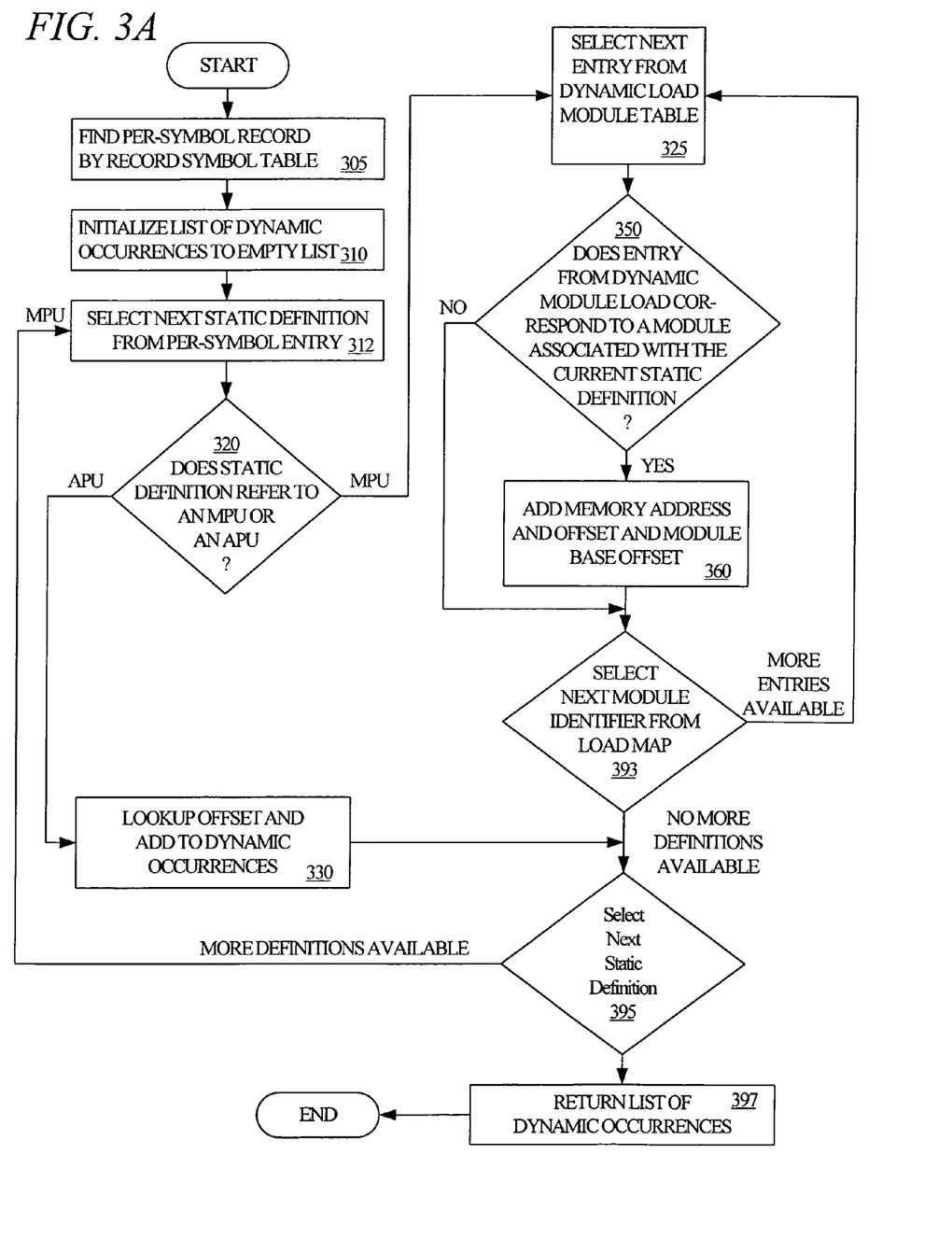
FIG. 3A illustrates a method diagram for determining the memory address and location of a selected mapping indicia.

Turning now to FIG. 3A, illustrated is a method 300 for finding correlations between the mapping indicia 210 and the fields of the dynamic module load table 255. Generally, the method 300 determines the corresponding memory address (comprising an offset 230) for a given function within a load module correlated of a corresponding mapping indicia 210. This can be done as a sum of the offset 230 and the location 260.

After step start 302, in step 305, static symbol record identified by field 212, a row located in the symbol row record table 219 is accessed. In step 310, the method 300 initializes an array to place the memory addresses corresponding to the corresponding desired mapping indicia 210 for a given row of the symbol record table 219. In step 312, the method 300 then selects a first definition of the table 219.

In step 320, the method 300 employs the field 220 of the table 219 to determine if static definition corresponds to a first processor, such as the MPU 130, or a second processor, such as the APU 120. If the target processor indicia 220 refers to the first processor, such as the MPU 140, in step 330, the table 219 yields the corresponding memory offset 230. This is added to a known base address. In one embodiment, there is only one known memory address employed. This address is the base address of the entire integrated executable, and this may be stored in a data location, such as in the system memory 160. In another embodiment, the base address would always be zero, such as in systems using virtual memory for the system memory.

However, if the target indicia 220 refers to the second processor or execution environment, the method 300 then reads entries in the dynamic module load table 255 in step 325. Although the method 300 illustrates sequential selection, those of skill in the art understand that other methods of selection are also within the scope of the present invention. In step 350, the method 300 refers to the module identifier 240 in the dynamic module load table 260 to determine with which module the mapping indicia 210 is related. Generally, step 350 tests whether the entry 240 in the dynamic load table 255 refers to the module 240 which is identified in the per-record symbol table 219. If the module 240 of the dynamic table 255 describes the loading of a module which does not correspond to the module 240 of the currently processed static definition 219, step 393 is instead executed.

After step 350, step 360 is executed if the module identifier 240 of the dynamic map 255 corresponds to the module identifier 240 of the per symbol record table 219. Generally, step 360 adds the memory offset 230 of the static table 219 and the memory location 260 of the dynamic map 255 to give the address of the desired mapping indicia 210 as it is loaded into the selected execution environment. This information is given to the debugger to be conveyed to the programmer.

Then, step 393 tests whether there are any more modules in table 255 which relate to module identifier 240 in the table 219 corresponding to the module indentifiers 240 of the table 255 as loaded in the execution environments. In other words, step 393 is employed to find all locations where a module 240 is loaded to the possibly many APU local stores 125, by accessing the dynamic table 255. In one embodiment, this is done by the step 393 by testing for each load module entry 240 as to whether that entry 240 of the dynamic table 255 refers to the module referenced to the identifier by the static definition from the per-symbol record.

Generally, in step 393, the method 300 determines whether there are more modules dynamically loaded to be compared to the module referenced by the currently processed static definition corresponding to the module identifier 240. If there are more entries in the dynamic table 255, step 325 is executed. If not, step 395 is executed. Step 395 determines, whether or not there are any more modules 240 correlated to the mapping indicia 210 within the static table 219. If there are more rows of entries in the table 219 correlated to mapping indicia 210, step 312 is again executed. If not, the list of addresses is returned in step 397 to the debugger, and the method ends in step 399.

Generally, in method 300, the loop from 312 to 395 tests if there are modules which contain the mapping indicia, using field 240 from the table 219, and the loop from 325 to 393 tests if these modules are loaded, using module indicator 240 and other entries in the dynamic load table 255. The loop from 325 to 393 tests where are there other multiple copies of modules loaded to the second execution environment.

Figure 3B:
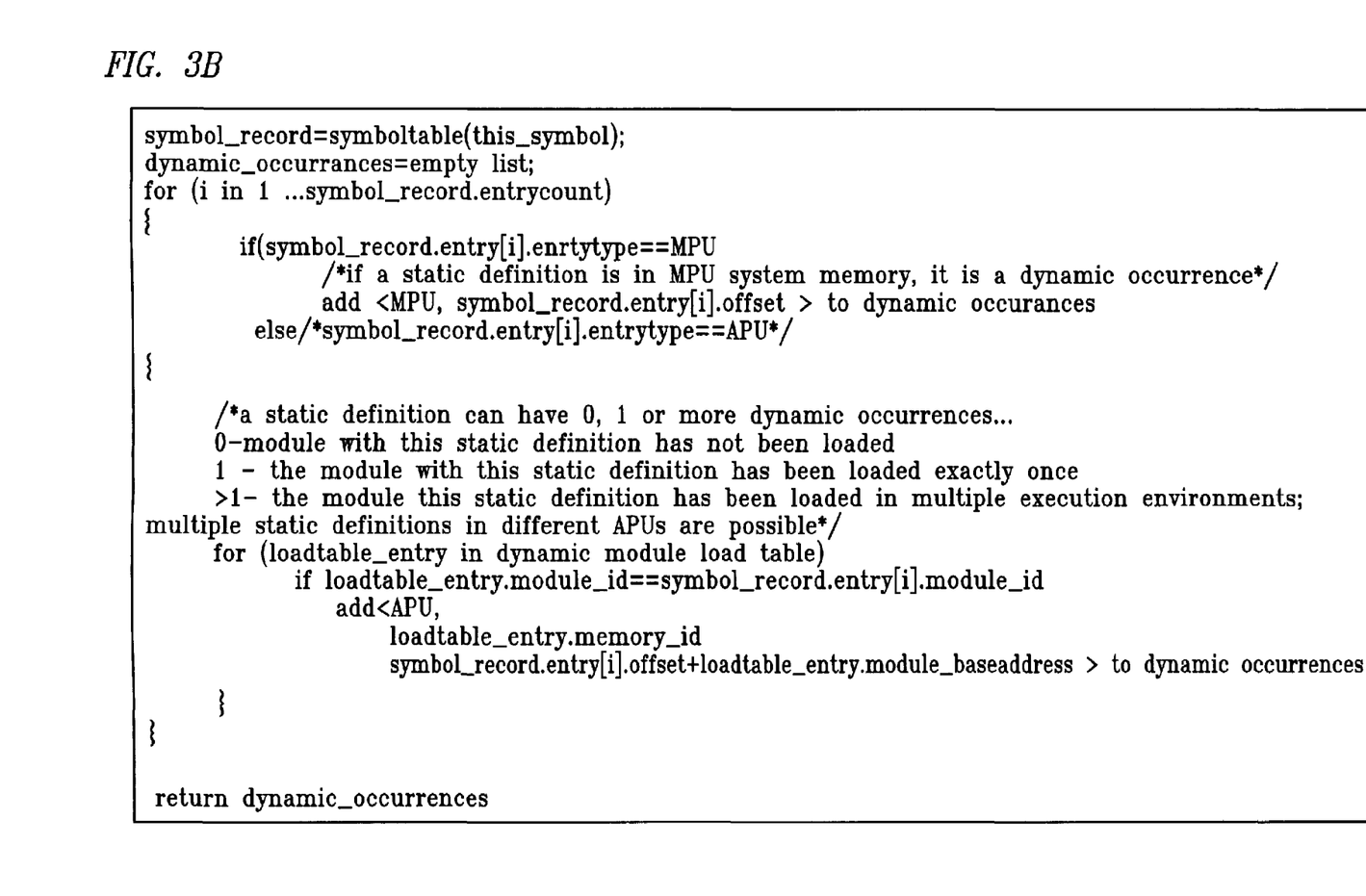
FIG. 3B illustrates pseudo-code for a method of determining the memory address and location of a selected mapping indicia.

Turning now to FIG. 3B, disclosed is a pseudo-code for finding dynamic occurrences of the mapping indicia 210. Generally, FIG. 3B illustrates pseudo-code implementing method 300.

In FIG. 3B, an empty list is initialized, and all occurrences of mapping indicia in different modules (the number of such occurrences being identified by the field symbol_record.entrycount) are checked in turn. In one embodiment, the number of occurrences is illustrated in FIG. 2B. For instance, "main" has 1 occurrence in the symbol record table 219, "printf" has 3 occurrences in symbol record table 219, and so on. For a corresponding entry in the symbol record table 219, if the module identifier 240 indicates an MPU 130, then MPU 130 indicia, and the offset 230 are added to the dynamic occurrences list. If the module identifier 240 indicates an APU 120, then the APU 120 indicia from module identifier 240, the memory offset 230, and memory location 260 are also loaded to the dynamic occurrences list. Once all modules identifiers 240 are finished, the listing ends.

Figure 4A:
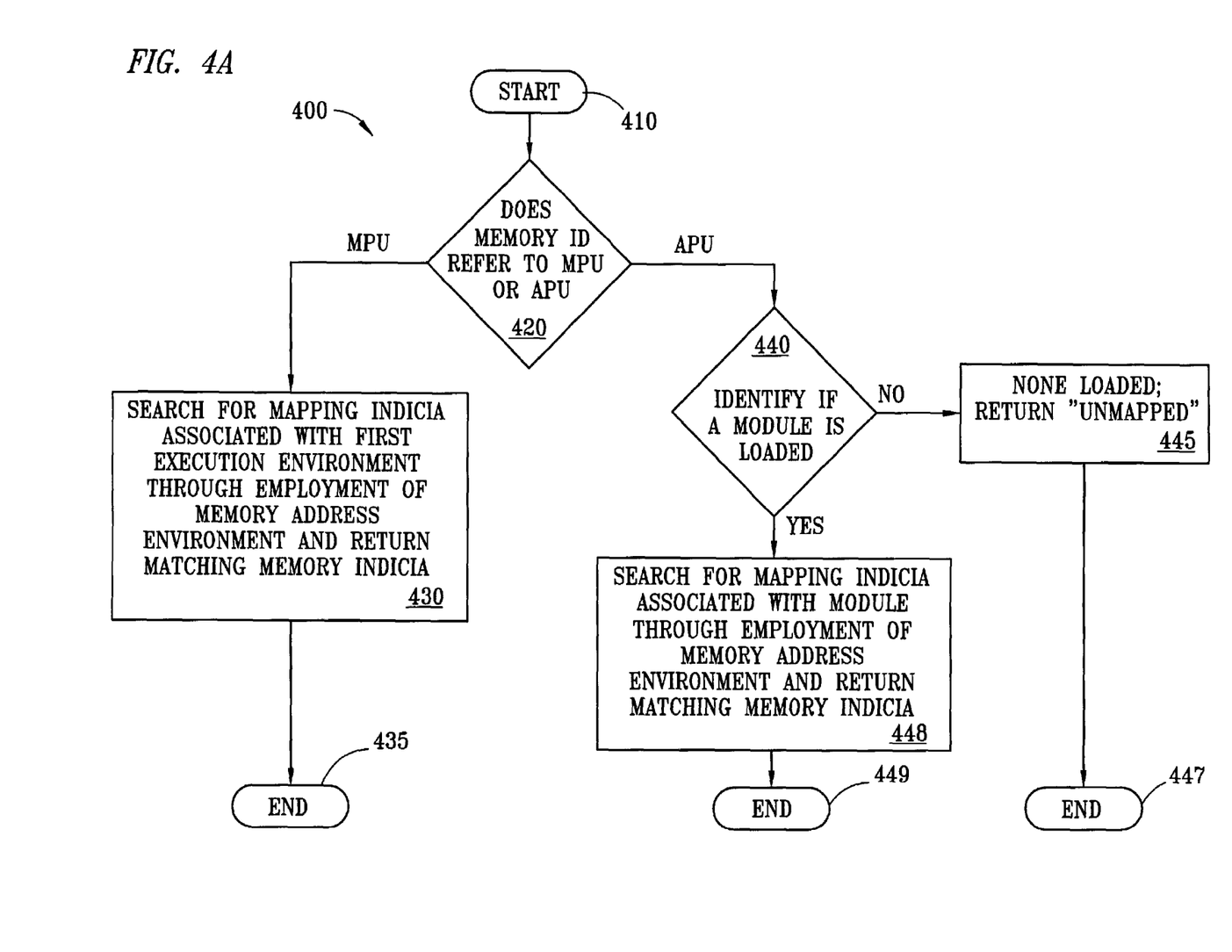
FIG. 4A illustrates a method diagram for determining mapping indicia associated with a module when only one module is loadable in the same local store at the same time.

Turning now to FIG. 4A, illustrated is a method diagram 400 for determining the mapping indicia 210 as a function of a memory address in a heterogeneous architecture. In the method 400, a comparison memory address is associated with both the target processor indicia 220 (which selects the system memory 160 or one of the local APU memories 125) and an address within such memory, which is a function of the memory offset 230. In a further embodiment, the heterogeneous address is also a function of the memory location 260.

After start 410, in step 420, the method 400 determines whether a memory address is (contained) within the first execution environment, such as the system memory 160, or contained within one of the second execution environments, such as the local store 125. This is identified by comparing field 265 to a memory space indicator supplied in conjunction with the comparison memory address. Generally, the memory space indicator and the comparison memory address can be supplied by the debugger, for such purposes as testing to determine a correlation between a comparison address and the values of the table 219.

If the comparison memory address, corresponding to the module load address 260 and the memory offset 230 associated with the memory space indicator, corresponds to the system memory 160, step 430 is executed. In one embodiment, the comparison memory address and the memory space indicator are supplied by a debugger. If the memory address comprising the memory offset 230, associated with the supplied memory space indicator, is found to have information correlating to the local store 125, step 440 is executed. Generally, the memory space indicator indicates into which specific memory, such as a first local store 125, a second local store 125, or the system memory 160, a module is tested to be loaded. This assumption is then tested by the method 400.

If step 430 is executed, the table 219 is searched by the method 400 for the mapping code indicia 210, if any, corresponding to the memory address offset 230, after which step 435, the end step, executes. In a further embodiment, the memory address offset 230 is summed with a load address of the main attached module.

However, if the memory space indicator refers to a second execution environment, such as local store 125 of APU 120, step 440 is executed. In step 440, the method 400 retrieves the module identifier 240 from the table 255. Step 440 then determines with which module or modules the selected memory address correlates from the module identifier 240, through employment of the memory offset 230 and the memory location 260. If no module is loaded to the local store 125, which is determined by there being no module identifier 240 in table 255, for the memory space indicator, the method 400 returns the message "none loaded" in step 445 and stops in step 447.

However, if a module is loaded to a local store 125, then the table 219 is searched by the method 400 for the mapping code indicia 210, if any, corresponding to the memory address offset 230, after which step 449, the end step, executes. In a further embodiment, the memory address offset 230 is summed with a load address of the main attached module. In one embodiment, the memory address employed by the method 400 comprises a function of the memory offset 230 returned in step 360 of the method 300.

Figure 4B:
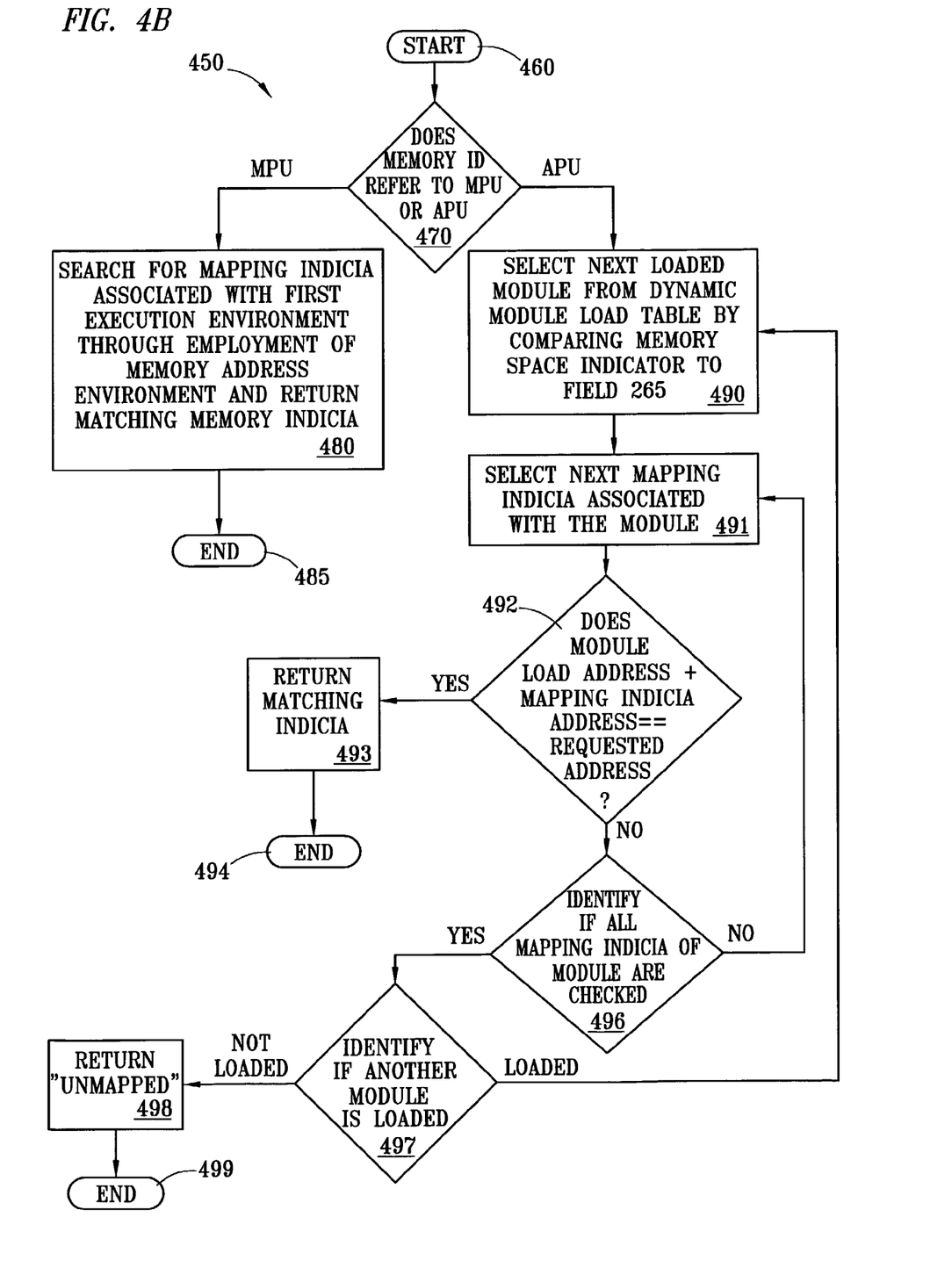
FIG. 4B illustrates a method diagram for determining mapping indicia associated with a module when more than one module is loadable in the same local store concurrently.

Turning now to FIG. 4B, illustrated is a method 450 for determining the mapping indicia 210 as a function of a memory address in an environment 100. In method 450, the local stores 125 are employable to have a plurality of modules loaded concurrently.

After start 460, in step 470, the method 400 determines whether a memory address is (contained) within the first execution environment, such as the system memory 160, or contained within one of the second execution environments, such as the local store 125. This is determined by reading the target processor indicia supplied in conjunction with the memory address. If the memory address corresponds to the system memory 160, step 480 is executed. If the memory address associated with the supplied target processor indicia corresponds to the local store 125, step 490 is executed.

If step 480 is executed, the table 209 is searched by the method 400 for the mapping code indicia 210, if any, corresponding to the memory address offset 230, after which step 435, the end step, executes. In a further embodiment, the memory address offset 230 is summed with a load address of the main attached module. However, if the memory address refers to a second execution environment, such as local store 125 associated with the APU 120, step 490 is executed. In step 490, the method 450 retrieves the module identifier 240 from the table 219 in the dynamic table 255 and compares to the memory space indicator in order to determine with which module or modules the memory address correlates.

In step 491, the method 450 selects the next mapping indicia 210 to be linked through employment of the module identifier 240 of the dynamic mapping table 255, through employment of the load address. In step 492, the method 450 determines whether the requested address equals the module load address 260 summed with the offset 230. If it does, then the linked mapping indicia table 209 returns the matching indicia in step 493, and ends in step 494. In one embodiment, the memory address employed by the method 450 comprises a function of the memory offset 230 and the module load location 260, wherein the memory address was returned in step 360 of the method 300.

In step 496, the method 450 determines whether or not all mapping indicia 210 to associated with a module 140 of the dynamic table 255 have been checked. If there are more mapping indicia 210 to be checked that are associated with the given module, the method 450 selects the next mapping indicia 210. However, if all mapping indicia 210 have been checked, step 497 determines if any more modules are loaded into the local storage 125 through employment of the module identifier 240 of the dynamic table 255. If there is another module stored in a local store 125, according to the module load 140 of the dynamic map 255, then step 490 is executed again. If there are no more modules loaded to the local store 125, then step 498 returns the value "unmapped," and step 499 ends the method 450.

Figure 5:
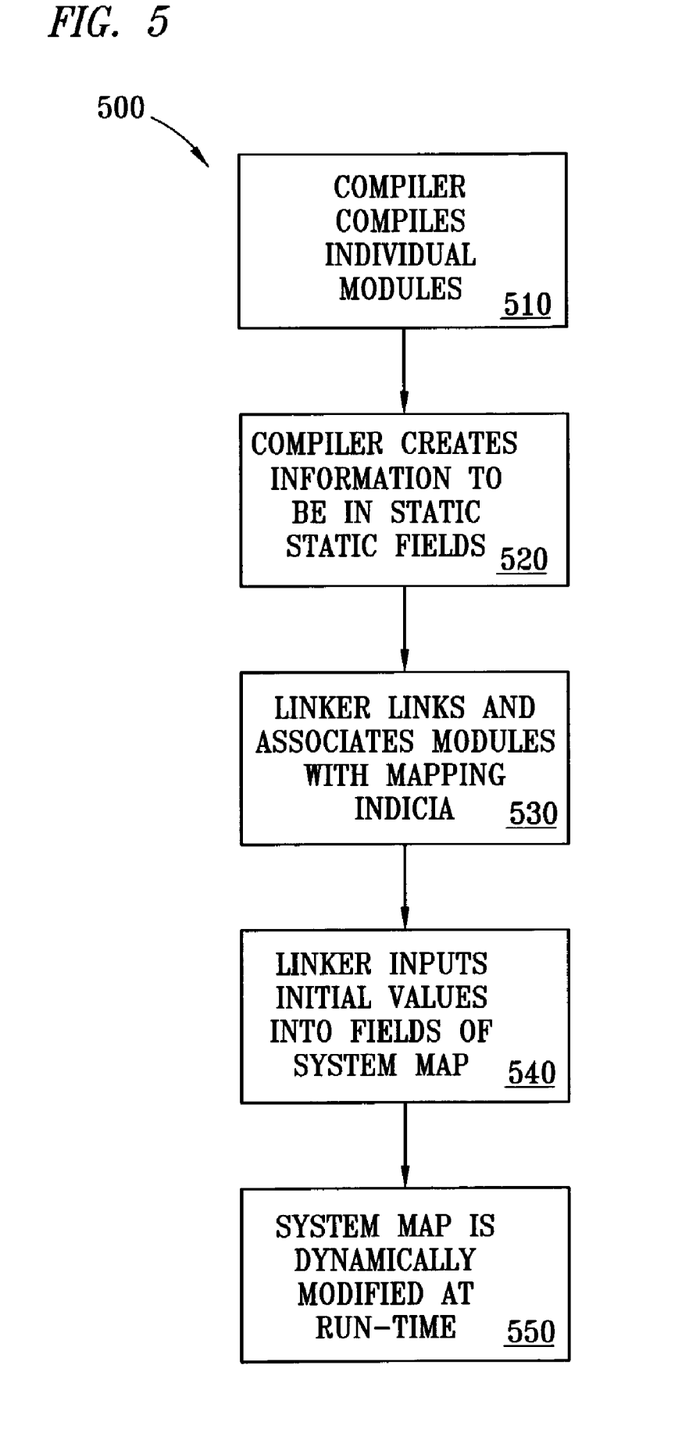
FIG. 5 illustrates a method diagram for the runtime environment to dynamically update the dynamic system map.

Turning now to FIG. 5, illustrated is a method 500 for creating and employing dynamic mapping information. In step 510, a compiler separates different pieces of source code as individual modules and converts them into object code. In step 520, the compiler creates the information to be stored in static tables, such as values in the static fields 210, 212, 220, 230, 240, and 250. In step 530, the linker links and associates the modules with one another. Typically, the linker first associates all the modules targeted at APUs 120 together, and then associates this bound section of object code to the object code module destined for the MPU 130.

In step 540, after linking the various compiled modules to one another, the linker then inputs the initial values into the dynamic system map 200. In step 550, run-time, the environment 100 builds and modifies dynamic table. In one embodiment, dynamic fields are the module identifier 240, the memory location 260, and the stored APU 265, Generally, in step 550, the dynamic system map 200 is dynamically created and updated by the operating system of the environment 100 when modules are loaded to or unloaded from one or more local stores 125 of the APUs 120, and whether a module has been loaded to the one or more local stores 125 of the APUs 120 and, if so, which APUs 120.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for dynamically mapping from a mapping indicia to a memory address or other register address, the method comprising:
    providing at least one memory offset associated with the mapping indicia;
    determining if the mapping indicia is of the type associated with a selected separate execution environment;
    selecting at least one module in which the mapping indicia is located, wherein the module selected is also associated with the selected separate execution environment and the module is a part of a software program;
    determining if the at least one module selected is loaded into the selected separate execution environment;
    dynamically updating a dynamic load map if the at least one module is loaded at run time to the selected separate execution environment;
    summing the memory offset and the memory address of the mapping indicia to produce a corresponding address if the at least one module selected is loaded into a memory of the selected separate execution environment; and
    providing the corresponding address.

2. The method of claim 1, further comprising signalling that the at least one module is not loaded in the selected execution environment.

3. The method of claim 1, further comprising determining the memory location of an unloaded module within a system memory.

4. The method of claim 1, further comprising the step of dynamically updating a dynamic load map when at least one module is unloaded at run time from the selected separate execution environment.

5. The method of claim 1, further comprising providing a plurality of memory offsets associated with the mapping indicia.

6. The method of claim 1, wherein selecting at least one module in which the mapping indicia is located further comprises determining a plurality of modules, in each of which the mapping indicia is located.

7. The method of claim 1, wherein determining if the mapping indicia is of the type associated with a selected separate execution environment further comprises determining if the mapping indicia is of the type associated with an attached processor unit.

8. A method for mapping from a memory address to mapping indicia for debugging integrated executables, the method, comprising:
    determining if the memory address is of the type associated with a selected separate execution environment;
    selecting at least one module to which the memory address is correlated, wherein the selected module is associated with the selected separate execution environment and the module is a part of a software program;
    determining if the at least one module, to which the memory address correlates, is loaded to the selected separate execution environment;

dynamically updating a dynamic load map when the at least one module is loaded at run time to the selected separate execution environment or when the at least one module is unloaded at run time from the selected separate execution environment;

determining at least one memory offset associated with the mapping indicia; and returning mapping indicia and the memory offset from the selected separate execution environment, wherein the mapping indicia corresponds to the memory address, if the at least one module is loaded to the separate execution environment.

9. The method of claim 8, wherein the step of selecting at least one module, to which the memory address correlates, further comprises determining a plurality of modules in which the memory address is correlated.

10. The method of claim 8, further comprising a step of signalling that the at least one module is loaded to a memory register specified by the memory address.

11. A method for producing a system data map for mapping between at least two separate execution environments, wherein the method comprises:

producing a mapping indicia corresponding to at least one module, wherein the module is part of a software program;

determining at least one memory offset of the mapping indicia from a determined memory location;

determining if the at least one module selected is loaded into the at least one separate execution environment;

dynamically updating the system data map if the at least one module is loaded at run time to the at least one separate execution environment; and providing indicia of the at least one separate execution environment, wherein the indicia is dependent upon the mapping indicia and the memory offset.

12. The method of claim 11, wherein the at least one memory offset comprises a plurality of offsets of the address of the mapping indicia.

13. The method of claim 12, wherein the plurality of offsets of the address of the mapping memory correspond to a plurality of separate execution environments, which may include more separate execution environments than said at least two separate execution environments.

14. The method of claim 11, further comprising indicia of a module in which the mapping indicia resides.

15. The method of claim 11, further comprising indicia of the memory address of an unloaded copy of a module, in which the mapping indicia resides in the memory space of a system memory.

16. The method of claim 11, wherein the mapping indicia comprises a file name and a line number.

17. The method of claim 11, wherein the mapping indicia comprises a symbol.

18. A method for mapping between mapping information and memory address within a multiple processor computer system, wherein the method is performed by the computer system, comprising:

producing a mapping indicia and a memory offset associated with a memory address of a software module;

classifying the mapping indicia and the memory offset according to a targeted processor;

associating software modules information with symbols; and dynamically tracking loading and unloading of the modules if a module is loaded to the targeted processor or unloaded from the targeted processor at runtime to provide accurate information about the multiple processor system, wherein this accurate information is updated during execution of a program.

19. A computer program product for dynamically mapping from a mapping indicia to a memory address or other register address, the computer program product having a medium with a computer program embodied thereon, the computer program comprising:

computer code for providing at least one memory offset associated with the mapping indicia;

computer code for determining if the mapping indicia is of the type associated with a selected separate execution environment;

computer code for selecting at least one module in which the mapping indicia is located, wherein the module is also associated with the selected separate execution environment and the module is a part of a computer program;

computer code for determining if the at least one module associated with the mapping indicia is loaded into the memory of the selected separate execution environment;

computer code for dynamically updating a dynamic load map if the at least one module is loaded at run time to the selected separate execution environment;

computer code for summing the memory offset and the memory address of the mapping indicia to produce a corresponding address if the at least one module selected is loaded into the memory of the selected separate execution environment; and computer code for providing the corresponding address.

20. A processor for dynamically mapping from a mapping indicia to a memory address or other register address, the processor including a computer program comprising:

computer code for providing at least one memory offset associated with the mapping indicia;

computer code for determining if the mapping indicia is of the type associated with a selected separate execution environment;

computer code for selecting at least one module in which the mapping indicia is located, wherein the module is also associated with the selected separate execution environment and the module is part of a computer program;

computer code for determining if the at least one module associated with the mapping indicia is loaded into the memory of the selected separate execution environment;

computer code for dynamically updating a dynamic load map if the at least one module is loaded at run time to the selected separate execution environment;

computer code for summing the memory offset and the memory address of the mapping indicia to produce a corresponding address if the at least one module selected is loaded into the memory of the selected separate execution environment; and computer code for providing the corresponding address.

* * * * *